(12) United States Patent
Nam et al.

(10) Patent No.: US 11,730,300 B2
(45) Date of Patent: Aug. 22, 2023

(54) WIRELESS INDUCTION HEATING COOKER HAVING IMPROVED COOKING UNIFORMITY

(71) Applicant: LG Electronics Inc., Seoul (KR)

(72) Inventors: Hyeunsik Nam, Seoul (KR); Wan Soo Kim, Seoul (KR); Byungkyu Park, Seoul (KR)

(73) Assignee: LG Electronics Inc., Seoul (KR)

( * ) Notice: Subject to any disclaimer, the term of this patent is extended or adjusted under 35 U.S.C. 154(b) by 479 days.

(21) Appl. No.: 16/903,981

(22) Filed: Jun. 17, 2020

(65) Prior Publication Data

US 2021/0186249 A1 Jun. 24, 2021

(30) Foreign Application Priority Data

Dec. 18, 2019 (KR) .................. 10-2019-0170124

(51) Int. Cl.
*A47J 27/00* (2006.01)
*H05B 6/12* (2006.01)
*H02J 50/10* (2016.01)
*A47J 36/16* (2006.01)

(52) U.S. Cl.
CPC ............ *A47J 27/004* (2013.01); *A47J 36/16* (2013.01); *H02J 50/10* (2016.02); *H05B 6/1236* (2013.01); *H05B 6/1245* (2013.01); *H05B 6/1272* (2013.01)

(58) Field of Classification Search
CPC .......... A47J 27/004; A47J 36/16; H02J 50/10; H05B 6/1209; H05B 6/1236; H05B 6/1245; H05B 6/1272; H05B 6/1254; H05B 6/1227

USPC ......................................................... 219/621
See application file for complete search history.

(56) References Cited

U.S. PATENT DOCUMENTS

2013/0098902 A1* 4/2013 Hoffmann ............... H05B 6/36
219/622
2013/0248517 A1* 9/2013 Moon .................. H05B 6/1236
219/626

FOREIGN PATENT DOCUMENTS

| JP | 2001299570 A | * | 10/2001 | |
|---|---|---|---|---|
| JP | 5943770 | | 7/2016 | |
| JP | 2019180534 A | * | 10/2019 | |
| KR | 20180054383 | | 5/2018 | |
| WO | WO-2017175321 A1 | * | 10/2017 | ............... F24C 7/02 |

* cited by examiner

*Primary Examiner* — Nathaniel E Wiehe
*Assistant Examiner* — Spencer H. Kirkwood
(74) *Attorney, Agent, or Firm* — Fish & Richardson P.C.

(57) ABSTRACT

A wireless induction heating cooker is configured to operate on an induction heating apparatus. The wireless induction heating cooker includes a main body, an internal pot configured to be disposed in the main body, a plurality of receiving coils disposed at a bottom surface of the main body and arranged along a circumferential direction of the internal pot, and a plurality of lateral surface heating coils spaced apart from the bottom surface of the main body and arranged along a lateral surface of the internal pot. Each of the plurality of lateral surface heating coils is connected to one of the plurality of receiving coils that is disposed at an opposite side with respect to a reference line passing through the bottom surface of the main body.

20 Claims, 15 Drawing Sheets

RELATED ART

RELATED ART

WIRELESS INDUCTION HEATING COOKER HAVING IMPROVED COOKING UNIFORMITY

CROSS-REFERENCE TO RELATED APPLICATION

This application claims priority to and the benefit of Korean Patent Application No. 10-2019-0170124, filed in on Dec. 18, 2019, the disclosure of which is incorporated herein by reference in its entirety.

TECHNICAL FIELD

The present disclosure relates to a wireless induction heating cooker that can provide cooking uniformity even when the wireless induction heating cooker is partially misaligned on a working coil of an induction heating apparatus.

BACKGROUND

Various types of cooking devices may use a method of wireless induction heating. For example, an induction heating apparatus may heat an object subject to cooking using a magnetic field rather than heating the object subject using heat generated in the heating apparatus.

In some examples, the method for heating an object using a magnetic field may be carried out by an induction heating apparatus and a cooker. Specifically, based on electromagnetic induction between the induction heating apparatus and the cooker, power may be transmitted from the induction heating apparatus to the cooker, and the power transmitted to the cooker may heat and cook an object in the cooker.

In some cases, a working coil in the induction heating apparatus and a power reception coil in the cooker may be magnetically coupled with a high coupling coefficient. The working coil and the power reception coil may be aligned for induction heating.

FIG. 1A and FIG. 1B illustrate an example of an operation method of an induction heating cooker in related art.

Referring to FIG. 1A, in the induction heating cooker 1 of the related art includes a cooking unit 10 and a power unit 20. An internal pot 60 is accommodated in an internal pot accommodation part 14 in the cooking unit 10, and an induction heating coil 15 for heating the internal pot 60 is provided at a lower portion of the internal pot accommodation part 14. A power reception coil 16, which receives power to be supplied to the induction heating coil 15 from the power unit 20, is provided on a bottom surface of a main body 12 of the cooking unit 10.

The power unit 20 includes a power supply coil 23 disposed to face the power reception coil 16 for a magnetic coupling with the power reception coil 16. In this case, to align the power reception coil 16 and the power supply coil 23, a main body lock 17 that fixes the cooking unit 10 and the power unit 20 mutually is provided at the main body 12 of the cooking unit 10.

Referring to FIG. 1B, the induction heating cooker 1 of the related art includes the cooking unit 100 where the power reception coil 16 is fixedly disposed, and a power unit 20C where the power supply coil 23 is fixedly disposed are physically fixed through the main body lock 17 to align the power supply coil 23 serving as a working coil and the power reception coil 16 serving as a receiving coil.

In some cases, the cooking unit 10 may be operated only on the power unit 20 having a specific structure. For instance, when the cooking unit 10 is operated on another induction heating apparatus other than the power unit 20, alignment between the power reception coil 16 and the working coil may not be ensured. Thus, cooking performance may be deteriorated.

In some cases, an induction heating apparatus and a wireless induction heating cooker may be separately manufactured. Accordingly, a user may align the wireless induction heating cooker at a proper position on the induction heating apparatus manually to cook an object.

In some cases, the wireless induction heating cooker may be partially aligned or misaligned on the working coil the induction heating apparatus.

In some case, due to the misalignment between the apparatuses, the object in the wireless induction heating cooker may not be completely cooked or may be overheated depending on its position. In some cases, a deterioration of cooking uniformity may cause dissatisfaction to users.

SUMMARY

The present disclosure is directed to a wireless induction heating cooker that may provide cooking uniformity even when the wireless induction heating cooker is partially misaligned on a working coil of an induction heating apparatus.

The present disclosure is also directed to a wireless induction heating cooker that may heat even a lateral surface of an internal pot using a magnetic field generated in a working coil of an induction heating apparatus.

The present disclosure is also directed to a wireless induction heating cooker that may use a magnetic field, generated in an area with a small amount of heat delivered to an internal pot, to heat a lateral surface of the internal pot.

Aspects of the present disclosure are not limited to the above-described ones. Additionally, other aspects and advantages that have not been mentioned may be clearly understood from the following description and may be more clearly understood from implementations. Further, it will be understood that the aspects and advantages of the present disclosure may be realized via means and combinations thereof that are described in the appended claims.

According to one aspect of the subject matter described in this application, a wireless induction heating cooker is configured to operate on an induction heating apparatus. The wireless induction heating cooker includes a main body, an internal pot configured to be disposed in the main body, a plurality of receiving coils disposed at a bottom surface of the main body and arranged along a circumferential direction of the internal pot, and a plurality of lateral surface heating coils spaced apart from the bottom surface of the main body and arranged along a lateral surface of the internal pot. Each of the plurality of lateral surface heating coils is connected to one of the plurality of receiving coils that is disposed at an opposite side with respect to a reference line passing through the bottom surface of the main body.

Implementations according to this aspect may include one or more of the following features. For example, 2. the plurality of receiving coils may include a first receiving coil and a second receiving coil, and the plurality of lateral surface heating coils may include a first lateral surface heating coil connected to the first receiving coil and disposed at an opposite side of the first receiving coil with respect to the reference line, and a second lateral surface heating coil connected to the second receiving coil and disposed at an opposite side of the second receiving coil with respect to the reference line.

In some implementations, the plurality of receiving coils may be configured to induce electric currents based on a magnetic field being generated in a working coil of the induction heating apparatus. In some implementations, each of the plurality of receiving coils may be configured to supply induced electric current to a corresponding heating coil among the plurality of lateral surface heating coils, and the plurality of lateral surface heating coils may be configured to heat the lateral surface of the internal pot based on the induced electric current.

In some implementations, the wireless induction heating cooker may further include a metallic plate disposed on the lateral surface of the internal pot and configured to be heated by a magnetic field generated in the plurality of receiving coils and by the plurality of lateral surface heating coils.

In some implementations, the wireless induction heating cooker may further include a resonance capacitor that connects one of the plurality of receiving coils to one of the plurality of lateral surface heating coils. In some examples, centers of the plurality of receiving coils may be arranged on the bottom surface of the main body along the circumferential direction of the internal pot, and centers of the plurality of lateral surface heating coils may be disposed in a plane parallel to the bottom surface of the main body and are arranged along the circumferential direction of the internal pot.

In some examples, vertical distances between the bottom surface of the main body and the centers of the plurality of lateral surface heating coils may be equal to one another.

In some implementations, the reference line may be a vertical line through a center of the internal pot. Radial distances from the vertical line to centers of the plurality of receiving coils may be equal to one another, and radial distances from the vertical line to centers of the plurality of lateral surface heating coils may be equal to one another.

In some implementations, the plurality of receiving coils may be arranged on the bottom surface of the main body that faces a working coil of the induction heating apparatus.

In some implementations, the internal pot may include a round portion that extends upward from a bottom surface of the internal pot, and the round portion may have a lower end that is connected to the bottom surface of the internal pot and that defines a first radius of the internal pot, and an upper end that is disposed vertically above the lower end and that defines a second radius of the internal pot that is different from the first radius. The plurality of receiving coils may be disposed radially outside the lower end of the round portion.

In some implementations, the internal pot may include a round portion that defines a first radius of the internal pot and a second radius of the internal pot, and the plurality of receiving coils may face a lower part of the round portion of the internal pot. In some examples, the second radius of the internal pot may be greater than the first radius of the internal pot, and a distance between the reference line and an outer edge of each of the plurality of receiving coils may be greater than the second radius of the internal pot. In some examples, a center of one of the plurality of receiving coils and a center of one of the plurality of lateral surface heating coils connected to the one of the plurality of receiving coils may be disposed on a line that crosses the reference line.

In some implementations, the plurality of lateral surface heating coils are vertically arranged on the lateral surface of the internal pot. In some implementations, each of the plurality of lateral surface heating coils may be disposed on a plane that is inclined with respect to the bottom surface of the main body, and each of the plurality of lateral surface heating coils has a lower edge facing the bottom surface of the main body and an upper edge disposed vertically above the lower edge. A radial distance between the reference line and the lower edge may be less than a radial distance between the reference line and the upper edge.

In some implementations, the plurality of lateral surface heating coils may be disposed concavely along a round portion of the internal pot.

In some implementations, where the reference line is a vertical line through a center of the internal pot, central angles defined about the vertical line between two adjacent receiving coils among the plurality of receiving coils may be equal to one another, and central angles defined about the vertical line between two adjacent lateral surface heating coils among the plurality of lateral surface heating coils may be equal to one another.

In some implementations, the plurality of receiving coils may be arranged symmetrically with respect to the reference line, and the plurality of lateral surface heating coils may be arranged symmetrically with respect to the reference line. In some implementations, each of the plurality of receiving coils may have a flat shape parallel to the bottom surface of the main body, and each of the plurality of lateral surface heating coils may have a convex shape that protrudes outward relative to the lateral surface of the internal pot.

In some implementations, a plurality of receiving coils may be arranged along a circumferential direction of an internal pot and face a working coil of an induction heating apparatus. The plurality of receiving coils may be placed to face a plurality of lateral surface heating coils that are arranged along a lateral surface of the internal pot, thereby providing cooking uniformity even when a wireless induction heating cooker is partially aligned or misaligned on the working coil of the induction heating apparatus.

In some implementations, a plurality of receiving coils may be arranged to face a working coil of an induction heating apparatus and may be respectively connected to a plurality of lateral surface heating coils arranged along a lateral surface of an internal pot, thereby heating the lateral surface of the internal pot using a magnetic field generated in the working coil of the induction heating apparatus.

In some implementations, a plurality of receiving coils may be arranged to face a working coil of an induction heating apparatus and may be placed at a lower portion of a round area of an internal pot. The plurality of receiving coils may be respectively connected to a plurality of lateral surface heating coils arranged along a lateral surface of the internal pot, thereby utilizing a magnetic field generated in an area with a small amount of heat delivered to the internal pot to heat a lateral surface of the internal pot.

The wireless induction heating cooker may provide cooking uniformity even when a wireless induction heating cooker is partially aligned or misaligned on a working coil of an induction heating apparatus, thereby ensuring quality cooking uniformity regardless of a position of the wireless induction heating cooker and improving user convenience without strictly requiring a user to align the wireless induction heating cooker.

The wireless induction heating cooker may heat even a lateral surface of an internal pot using a magnetic field generated in a working coil of an induction heating apparatus, thereby forming a plurality of paths for heat delivery with a single heat source and ensuring temperature uniformity based on height of the internal pot.

The wireless induction heating cooker may use a magnetic field generated in an area with a small amount of heat delivered to an internal pot to heat a lateral surface of the internal pot, thereby efficiently using a magnetic field generated in a working coil to heat a lower portion and the lateral surface of the internal pot.

Detailed effects of the present disclosure are described together with the above-described effects in the detailed description of the disclosure.

DETAILED DESCRIPTION

Figure 1A:
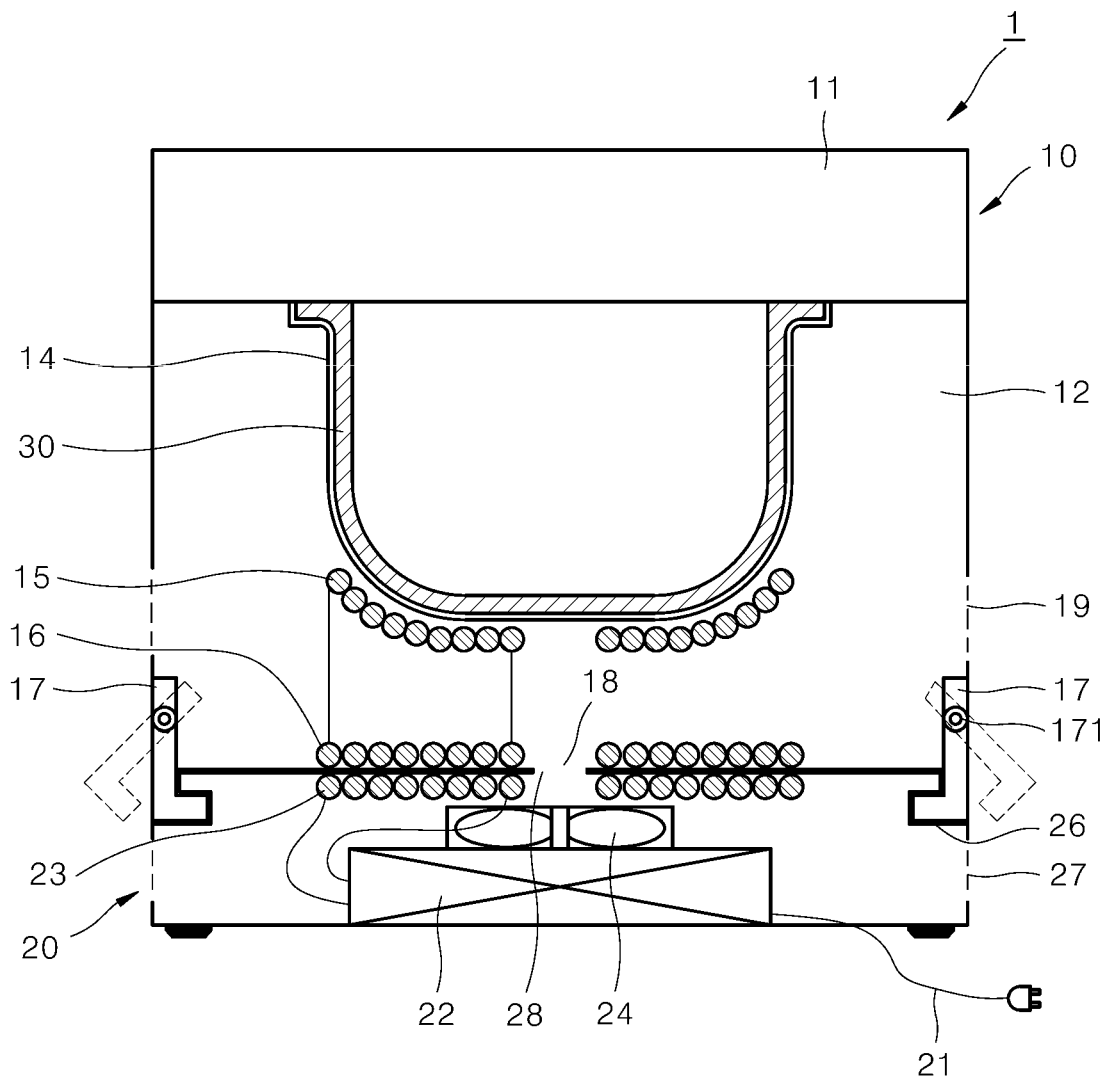
FIG. 1A and FIG. 1B are views illustrating examples of an operation method of an induction heating cooker in related art.

The above-described aspects, features and advantages are specifically described with reference to the accompanying drawings hereunder such that one having ordinary skill in the art to which the present disclosure pertains may easily implement the technical spirit of the disclosure. Below, one or more implementations of the present disclosure are specifically described with reference to the accompanying drawings. Throughout the drawings, identical reference numerals denote identical or similar components.

Below, an example wireless induction heating cooker is described with reference to FIGS. 2 to 9.

Figure 2:
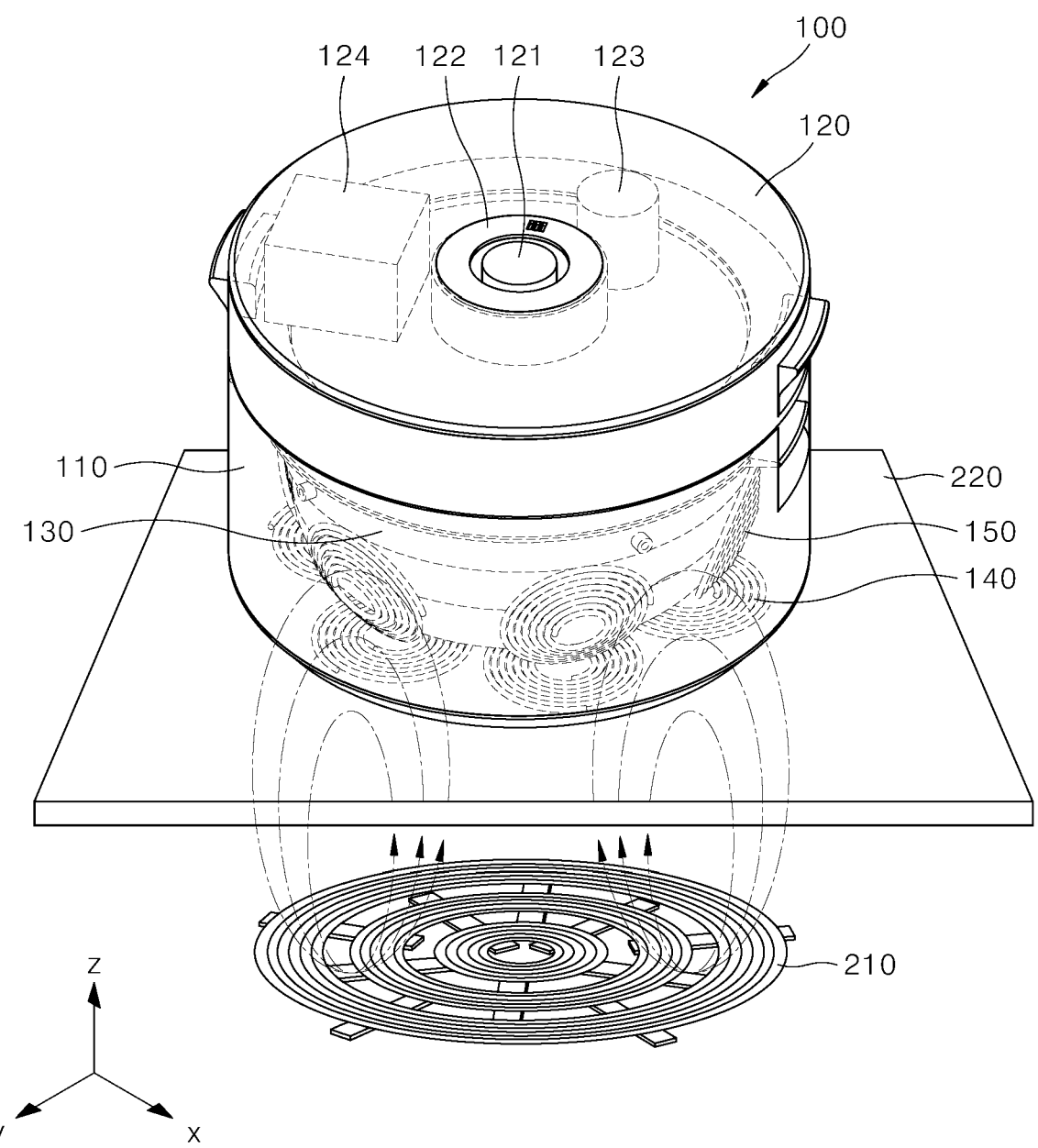
FIG. 2 is a view illustrating an example of a wireless induction heating cooker operating on an induction heating apparatus.
Figure 3:
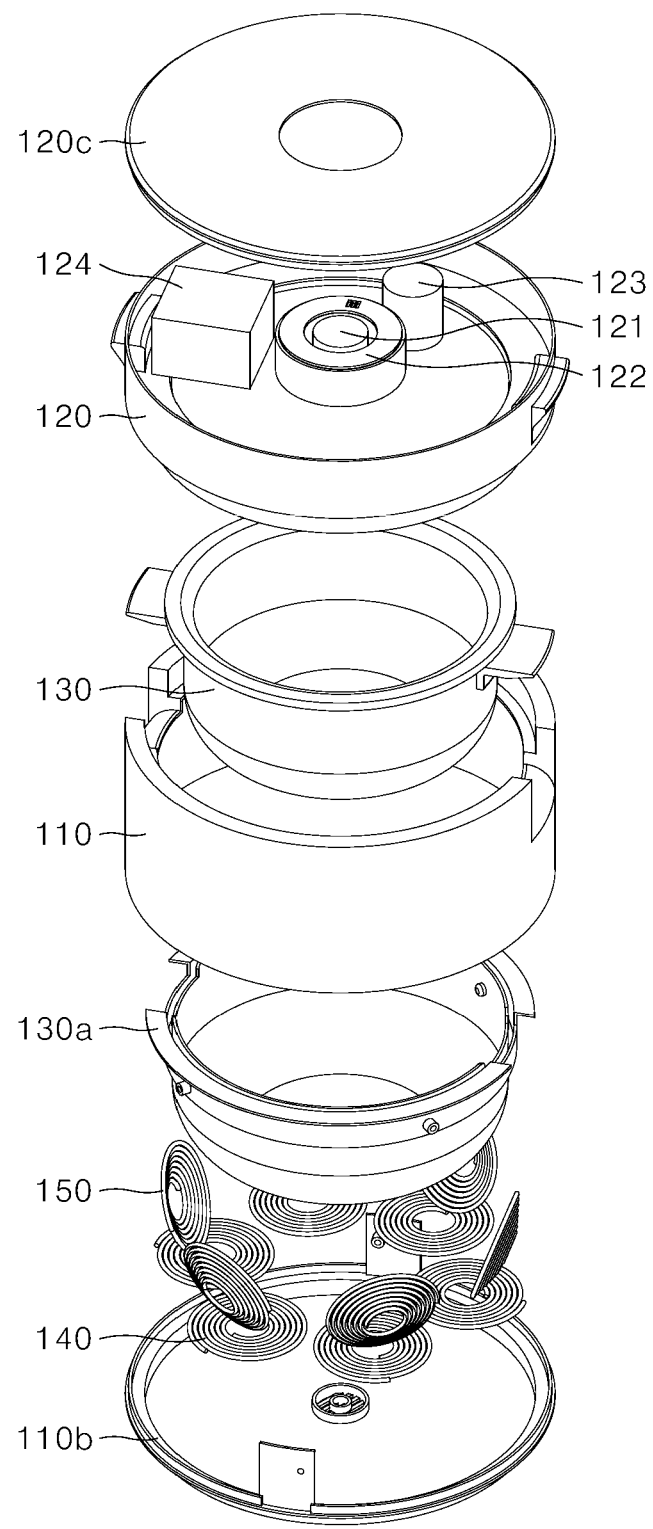
FIG. 3 is an exploded view illustrating the wireless induction heating cooker in FIG. 2.

FIG. 2 illustrates an example of a wireless induction heating cooker configured to operate on an induction heating apparatus, and FIG. 3 is an exploded view illustrating the wireless induction heating cooker in FIG. 2.

Figure 4:
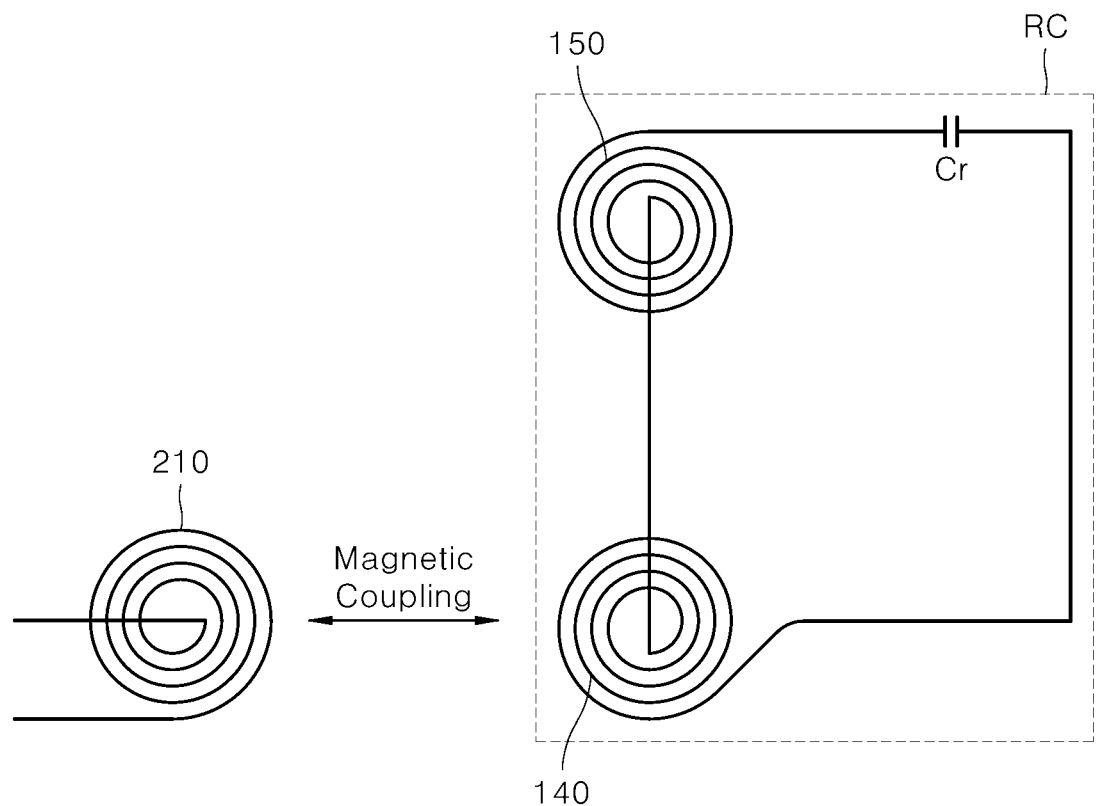
FIG. 4 is a circuit diagram illustrating an example of a receiving coil that is magnetically connected with a working coil of an induction heating apparatus, and an example of a later surface heating coil that is connected to the receiving coil.
Figure 5:
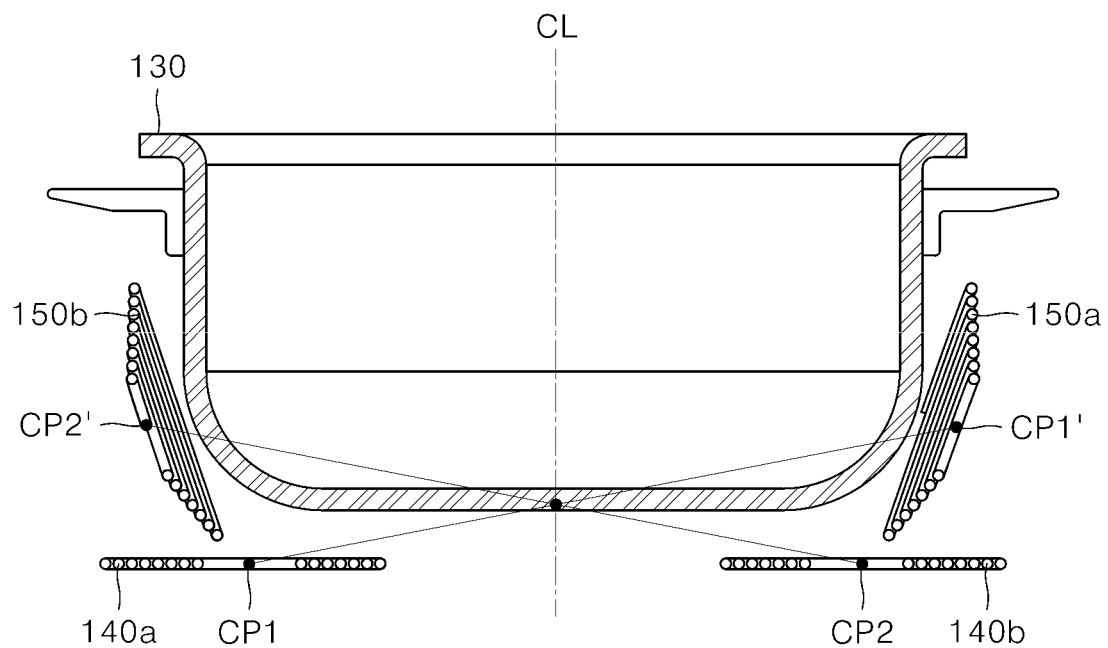
FIG. 5 is a view illustrating an example arrangement of a receiving coil and a lateral surface heating coil corresponding to the receiving coil.

FIG. 4 is a circuit diagram illustrating an example receiving coil that is magnetically connected with a working coil of an induction heating apparatus, and an example later surface heating coil connected to the receiving coil, and FIG. 5 is a view illustrating an example of an arrangement of a receiving coil and a lateral surface heating coil corresponding to the receiving coil.

Figure 6A:
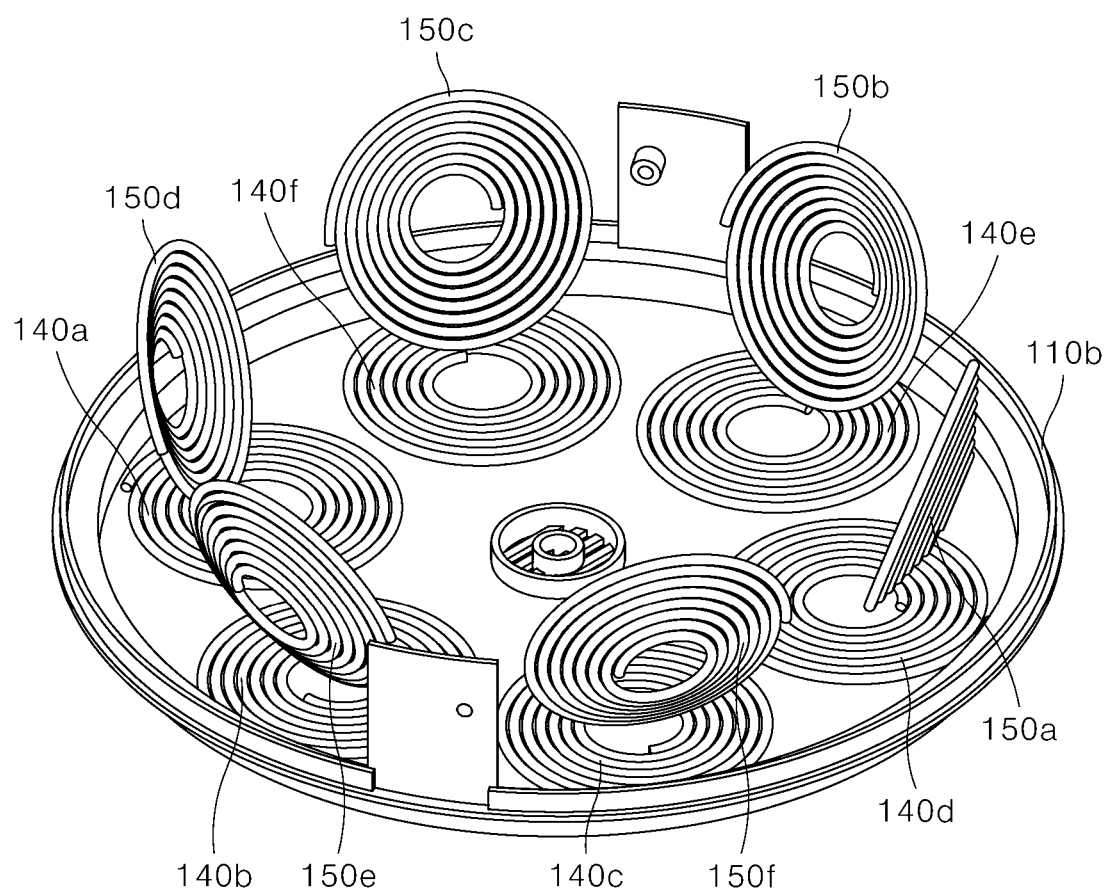
FIG. 6A and FIG. 6B are views illustrating an example of an internal pot surrounded by a plurality of lateral surface heating coils and a plurality of receiving coils.
Figure 6B:
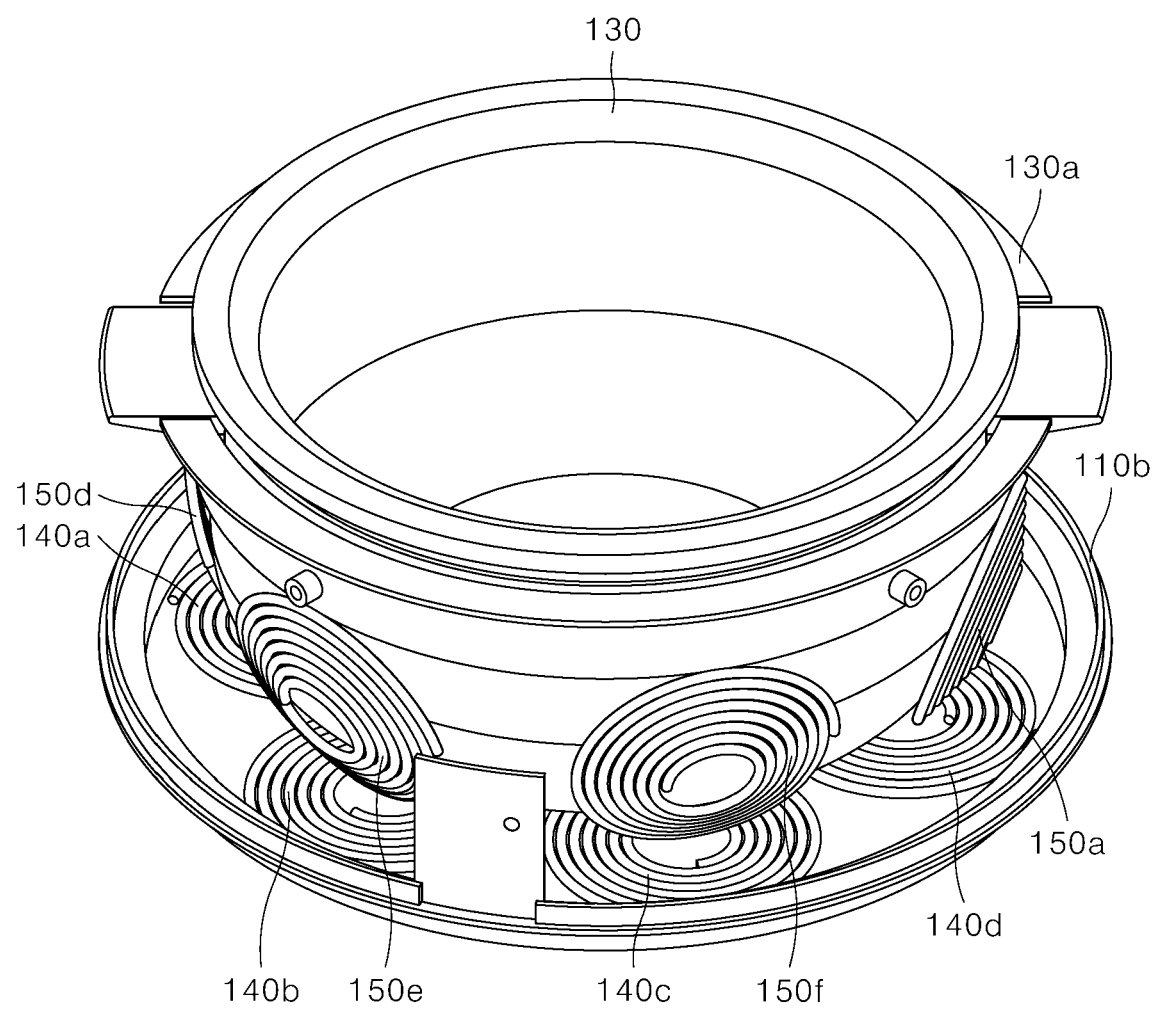

FIG. 6A and FIG. 6B illustrate an example internal pot surrounded by a plurality of lateral surface heating coils and disposed on a plurality of receiving coils.

Figure 7A:
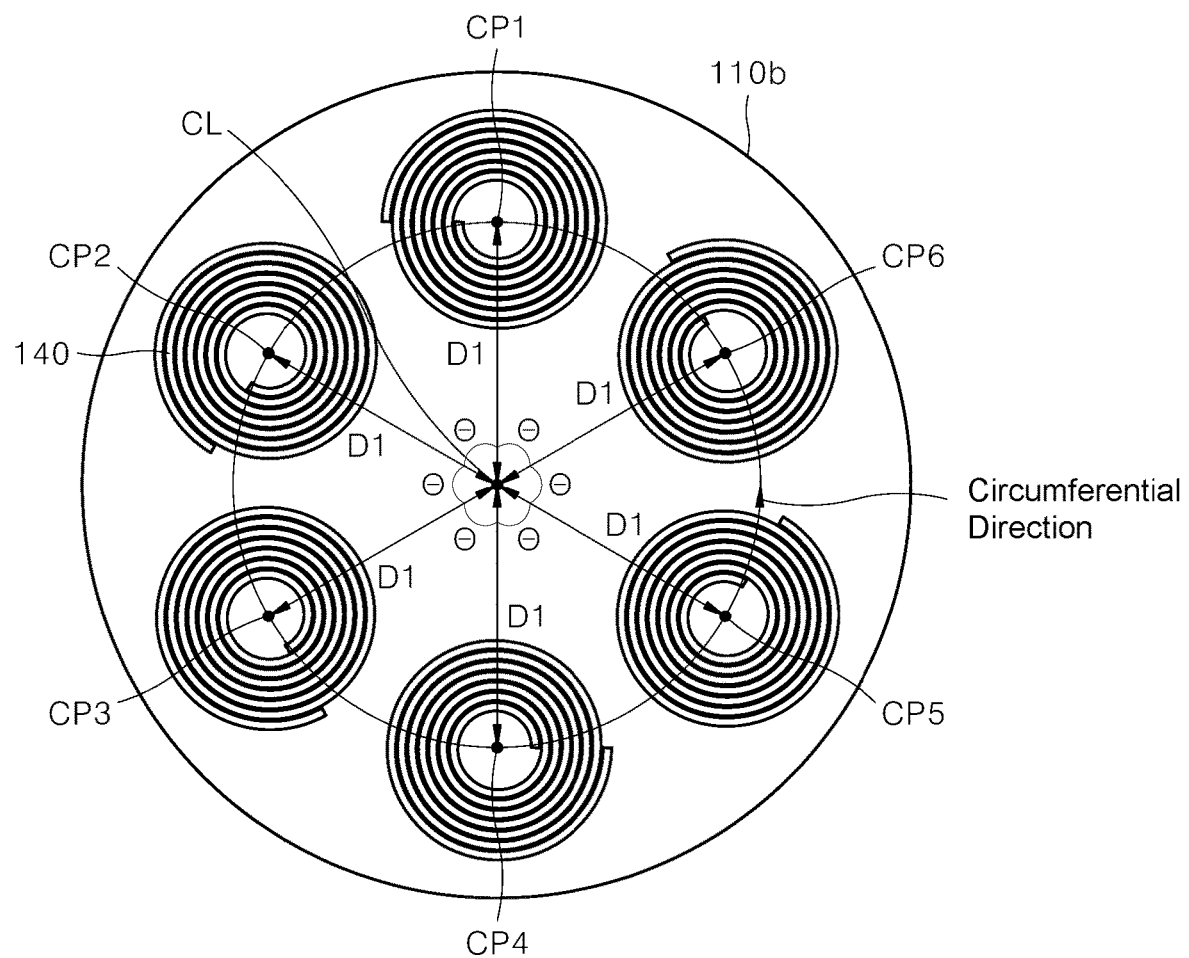
FIG. 7A and FIG. 7B are views illustrating example positions of example receiving coils and example lateral surface heating coils.
Figure 7B:
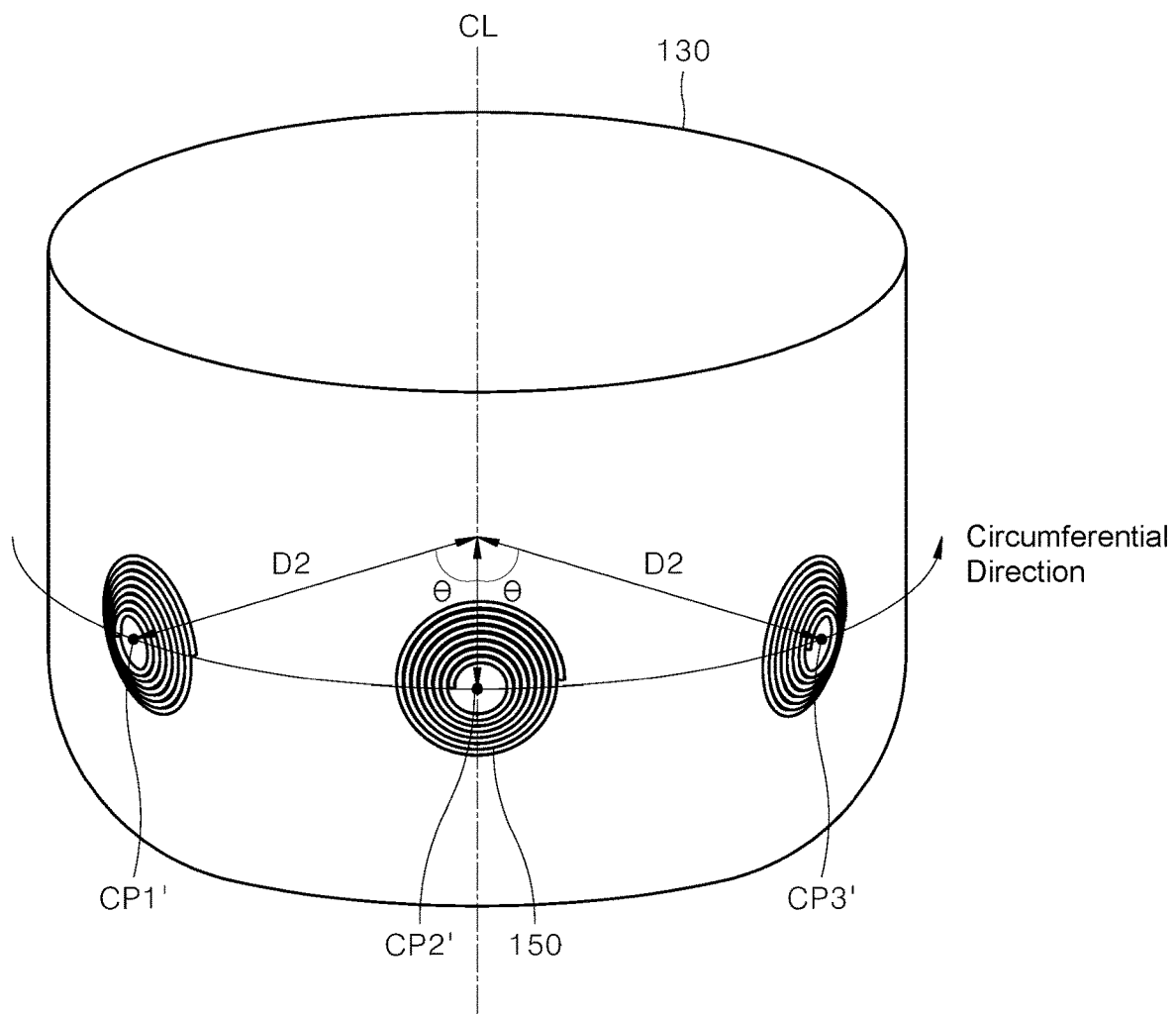

FIG. 7A and FIG. 7B illustrate example positions of example receiving coils and example lateral surface heating coils.

Figure 8A:
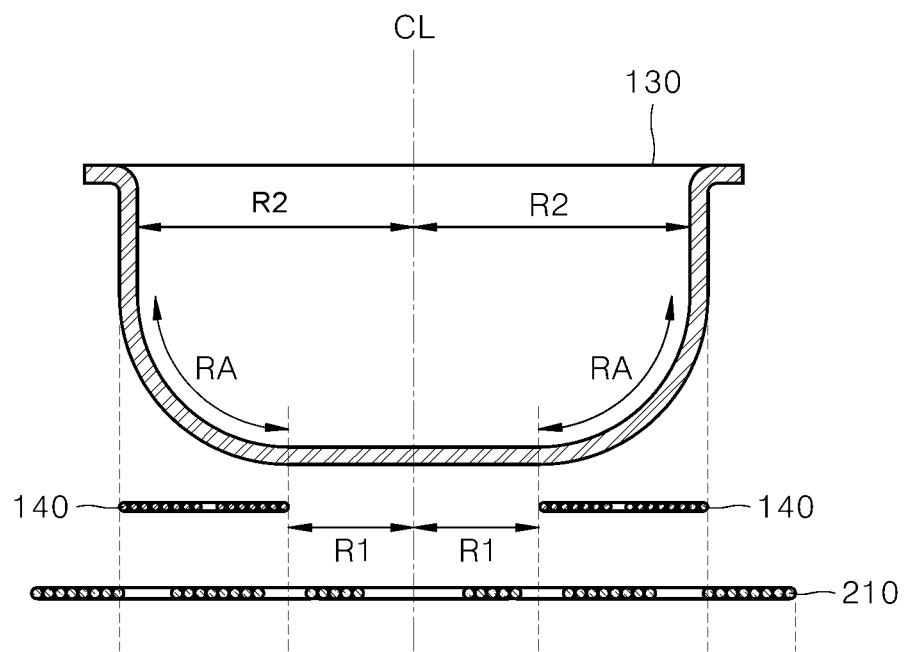
FIG. 8A and FIG. 8B are views illustrating example receiving coils disposed at a lower portion of an internal pot including a round portion.
Figure 8B:
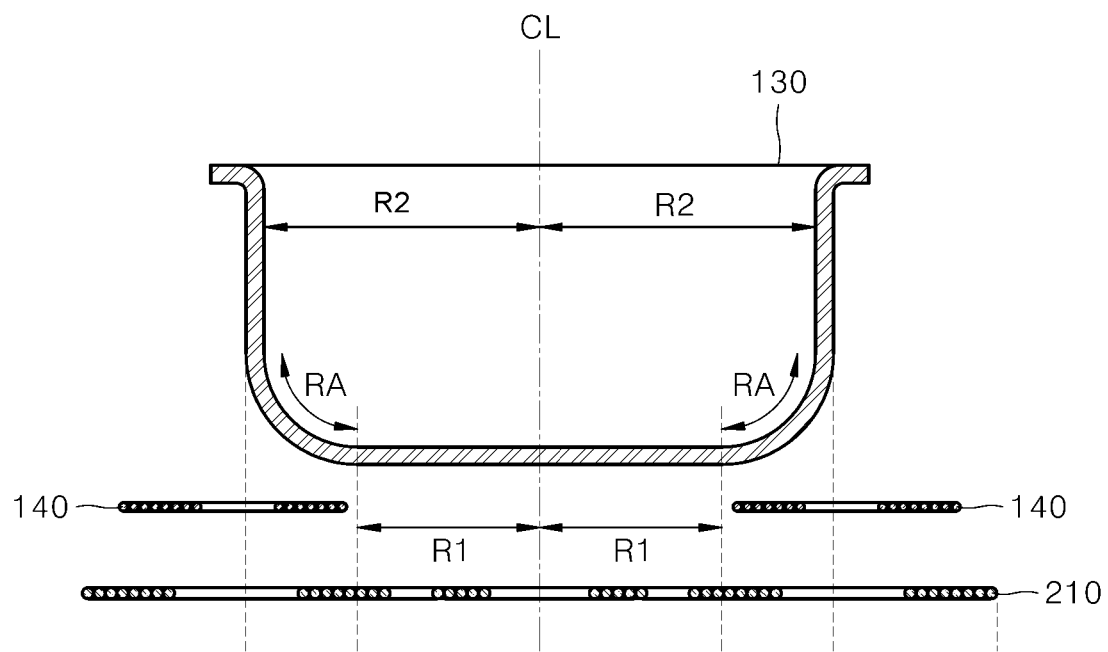
Figure 9A:
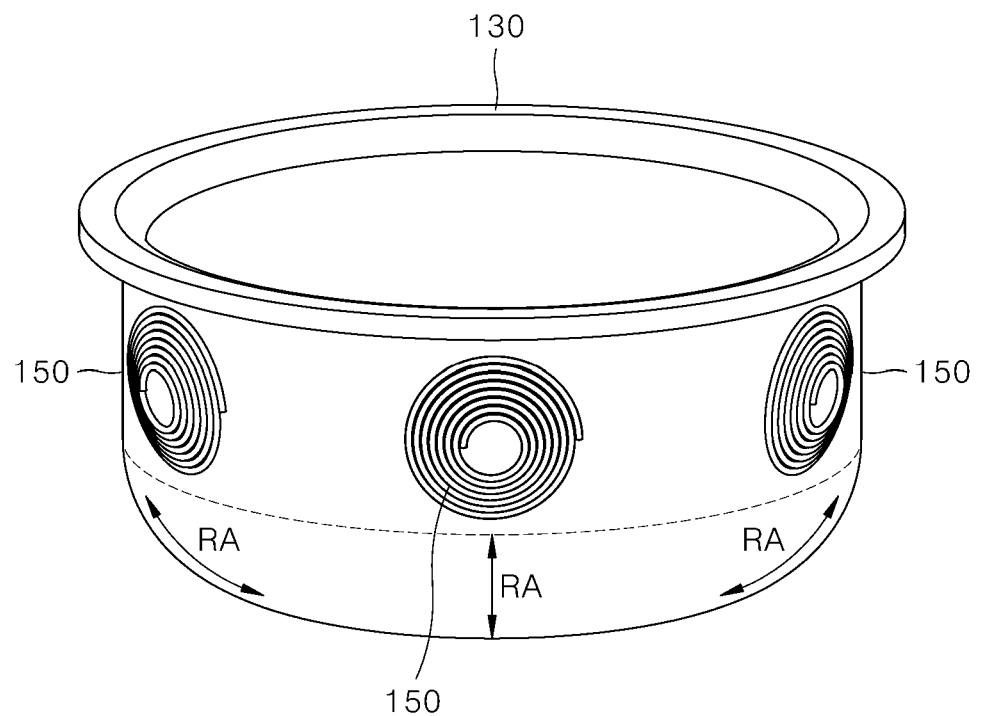
FIG. 9A and FIG. 9B are views illustrating an example of a lateral surface heating coil disposed on a lateral surface of an internal pot including a round portion.
Figure 9B:
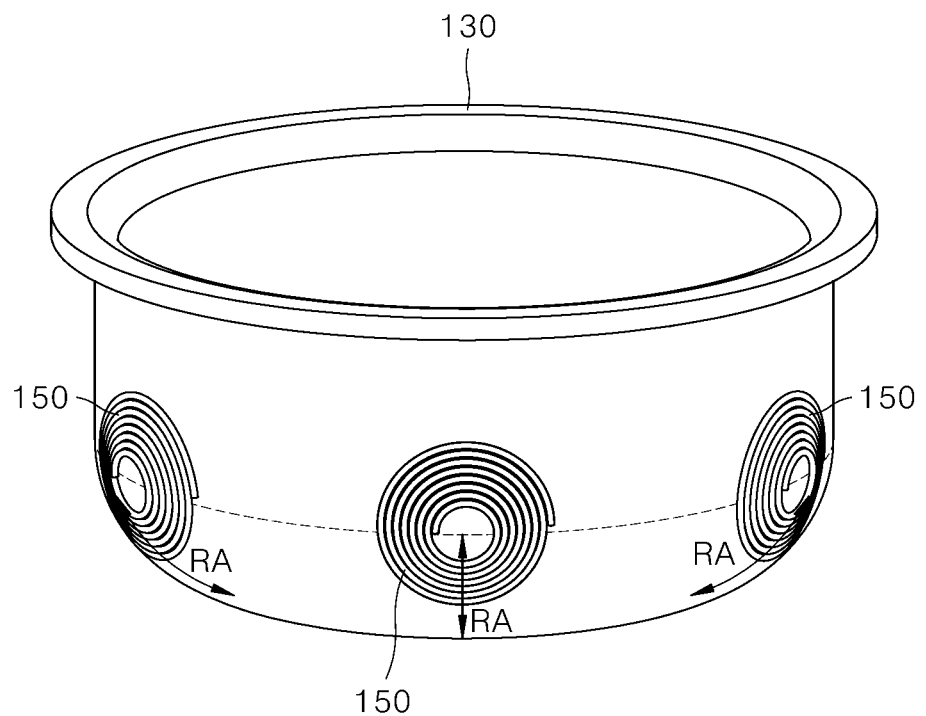

FIG. 8A and FIG. 8B illustrate an example receiving coil disposed at a lower portion of an internal pot including a round portion, and FIG. 9A and FIG. 9B illustrate an example lateral surface heating coil disposed on a lateral surface of an internal pot including a round portion.

Figure 10:
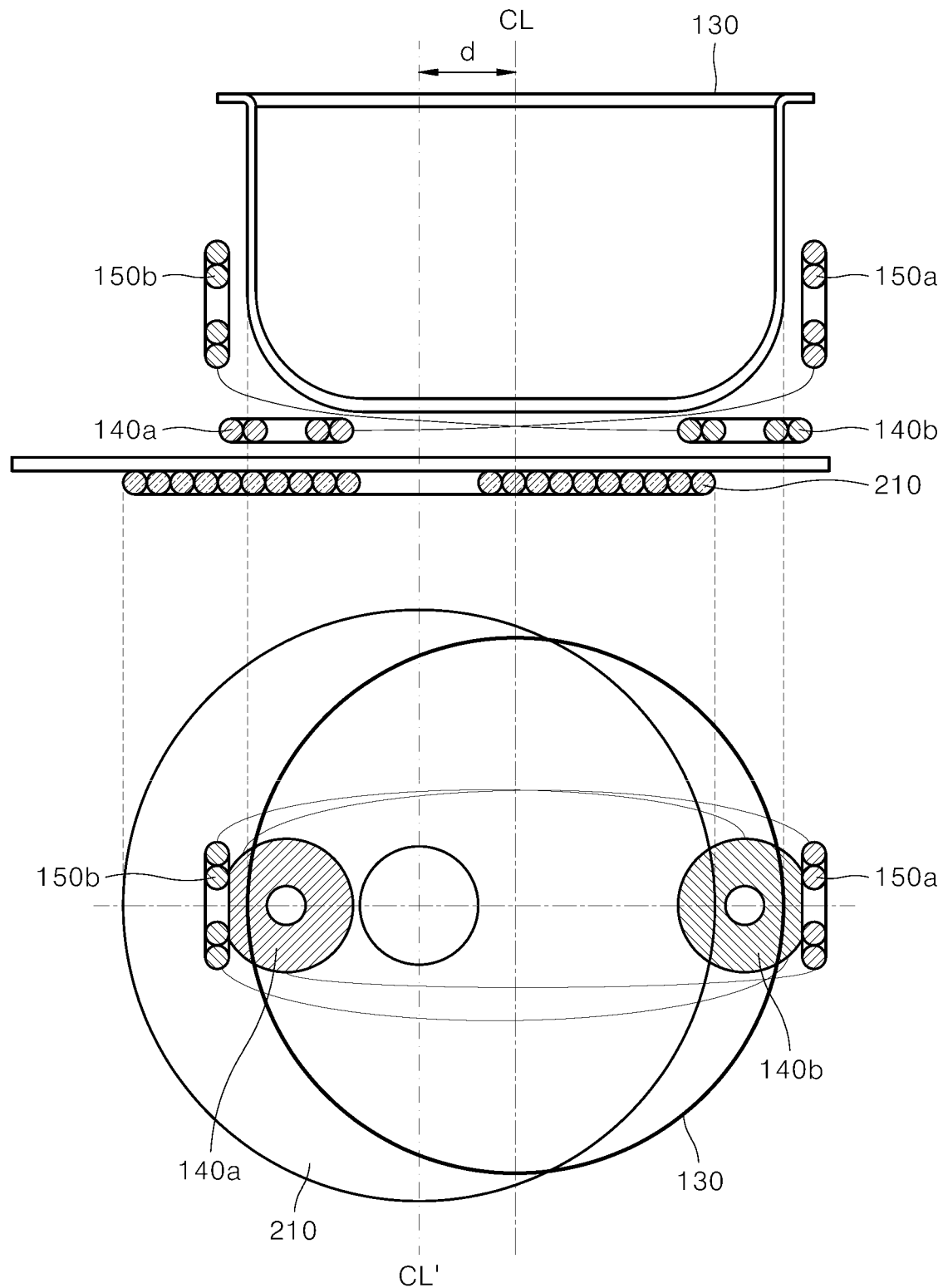
FIG. 10 is a view illustrating an example of a wireless induction heating cooker that is partially aligned with a working coil.

FIG. 10 illustrates an example of a wireless induction heating cooker that is partially aligned with a working coil.

Referring to FIG. 2, a wireless induction heating cooker 100 may operate on an induction heating apparatus. For example, the wireless induction heating cooker 100 may operate on an upper plate 200 of any induction heating apparatus provided with a working coil 210 in a state of being on a perpendicular line of the working coil 210.

Electric currents may flow through the working coil 210 by control of the induction heating apparatus. Accordingly, a magnetic field may be generated in the working coil 210. The magnetic field generated in the working coil 210 may heat an internal pot 130 in the wireless induction heating cooker 100.

In some implementations, referring to FIGS. 2 and 3, the wireless induction heating cooker 100 may include a main body 110, a lid 120, an internal pot 130, a metallic plate 130a, a receiving coil 140, and a lateral surface heating coil 150. The lid 120 may include a steam discharge module 121, a noise reduction module 122, a pressure weight 123, and a control module 124.

The wireless induction heating cooker 100 in FIGS. 2 and 3 is provided as one example, and components of the wireless induction heating cooker 100 are not limited to those of the implementation in FIGS. 2 and 3. When necessary, some components may be added, modified or removed.

For example, the main body 110, which is or includes a case that supports a lower portion and a lateral portion of the wireless induction heating cooker 100, may have a cylinder shape in which an upper portion is opened and a lower portion is sealed by a bottom surface 110b. The process of cooking may be performed in the main body 110. Specifically, the main body 110 may include an internal pot 130, a metallic plate 130a that wraps the internal pot 130, and a receiving coil 140 and a lateral surface heating coil 150 for heating the internal pot 130, therein. Various types of grain such as rice may be heated and cooked in the internal pot 130.

In some implementations, the lid 120 may be or include a case configured to seal an upper portion of the wireless induction heating cooker 100. The lid 120 may be coupled to the opened upper surface of the main body 110. An upper surface of the lid 120 may be sealed by a lid cover 120c. In this case, the lid 120 may be coupled to the upper surface of the main body 110 such that the lid 120 is opened and closed with respect to the upper surface of the main body 110. Specifically, the lid 120 may be hinge-coupled to the upper surface of the main body 110 such that the lid 120 is optionally opened and closed, or may be attached and detached by a coupler (e.g., a coupling ring) provided on the upper surface of the main body 110.

In some implementations, the lid 120 may include a control module 124 that may control some or entire operations of the wireless induction heating cooker 100. The control module 124 may include a printed circuit board (PCB) including a plurality of integrated circuits (IC).

In some implementations, the lid 120 may include a pressure weight 123 for constantly maintaining pressure in the wireless induction heating cooker 100, and a steam discharge module 121 (e.g., a solenoid valve) for discharging steam in the wireless induction heating cooker 100 outwards on the basis of a control signal provided by the control module 124. Furthermore, the lid 120 may include a noise reduction module 122 that includes a sound absorption member for reducing noise when steam is discharged.

The internal pot 130 may be stored in the main body 110 and may be heated by a magnetic field generated in the working coil 210 of the induction heating apparatus. The internal pot 130 may have a shape corresponding to a shape of an inner space of the main body 110. For example, in case the main body 110 has a cylinder shape, the internal pot 130 may have a cylinder shape in which an upper surface is opened.

When the wireless induction heating cooker 100 is placed on an upper portion of the induction heating apparatus, the working coil 210 and a lower surface of the internal pot 130 and may be placed to face each other with the bottom surface 110b of the main body 110 therebetween. A magnetic field generated in the working coil 210 may induce electric currents to the internal pot 130, and Joule's heat may be generated in the internal pot 130 by the induced currents.

For generation of induced currents, the internal pot 130 may be made of any material having magnetic properties. The internal pot 130, for example, may be made of cast iron including iron (Fe), or clad in which iron (Fe) and stainless steel and the like are welded.

The internal pot 130 may include a metallic plate 130a that is heated by a magnetic field generated in the below-described receiving coil 140 and lateral surface heating coil 150, on an outer surface thereof.

In case the internal pot 130 is made of a material (e.g., aluminum (Al), copper (Cu) and the like) that has almost no magnetic property or no magnetic property while having high thermal conductivity to improve efficiency of thermal conduction, almost no induced currents or no induced currents may be generated by a magnetic field in the internal pot 130.

In this case, even though the internal pot 130 has high thermal conductivity, heat is not generated in the internal pot 130. Accordingly, the internal pot 130 may include a metallic plate 130a on the outer surface thereof to deliver heat to the internal pot 130.

The metallic plate 130a may be made of a material having a magnetic property. Additionally, the metallic plate 130a may be implemented as a component separate from the internal pot 130 and may be stored in the main body 110. The metallic plate 130a may coat the outer surface of the internal pot 130 through the process of metal spraying and the like. Accordingly, heat may be generated at the metallic plate 130a by a magnetic field, and the heat generated at the metallic plate 130a may be delivered to the internal pot 130.

A plurality of receiving coils 140 may be arranged in parallel on the bottom surface 110b of the main body 110 along a circumferential direction of the internal pot 130. The circumferential direction is a direction defined along a perimeter. In case the internal pot 130 has a cylinder shape, the circumferential direction may be a direction of a circumference of the cylinder. In case the internal pot 130 has a polyprism shape, the circumferential direction may be a direction of a perimeter of the polyprism. Referring to FIG. 3, the plurality of receiving coils 140 may be arranged in parallel on the bottom surface 110b of the main body 110 along a circumferential direction of the internal pot 130.

Electric currents may be induced to the plurality of receiving coils 140 by a magnetic field generated in the working coil 210 of the induction heating apparatus. To this end, the plurality of receiving coils 140 may be flatly arranged on the bottom surface 110b of the main body 110 to face the working coil 210.

Referring back to FIGS. 2 and 3, the plurality of receiving coils 140 may be implemented as a circular flat plate-shaped coil, and each receiving coil 140 may be disposed in parallel with the working coil 210 to face the working coil 210. A magnetic field generated in the working coil 210 may be interlinked with each receiving coil 140, and electric currents may be induced to the receiving coil 140 by the magnetic field interlinked with the receiving coil 140.

The electric currents induced to the receiving coil 140 may heat the internal pot 130. Specifically, when electric currents are induced to the receiving coil 140, a magnetic field may be generated in the receiving coil 140. The magnetic field generated in the receiving coil 140 may induce electric currents to the internal pot 130, and Joule's heat may be generated in the internal pot 130 by the induced currents.

That is, the internal pot 130, as described above, may be heated by a magnetic field generated in the working coil 210 or by a magnetic field generated in the receiving coil 140.

A plurality of lateral surface heating coils 150 may be connected respectively to the plurality of receiving coils 140 and may be arrange in parallel along a lateral surface of the internal pot 130 respectively on the opposite side of each receiving coil 140 connected to each of them. Referring to FIG. 2, the plurality of lateral surface heating coils 150 may be arranged in parallel on a circumferential surface of the internal pot 130.

In some examples, the lateral surface heating coils 150 may be disposed in a virtual plane that is parallel to a bottom surface of the main body 110. For example, centers of the lateral surface heating coils 150 may be disposed in the virtual plane, and vertical distances between the bottom surface of the main body 110 and the centers may be equal to one another.

In some implementations, a pair of coils including the receiving coil 140 and the lateral surface heating coil 150 that are connected to each other. In other words, any one receiving coil of the plurality of receiving coils 140 may be electrically connected to one lateral surface heating coil of the plurality of lateral surface heating coils 150.

Referring to FIG. 4, each of the plurality of receiving coils 140 and each of the plurality of lateral surface heating coils 150 may be connected through a resonance capacitor (Cr) to constitute a resonance circuit (or a tank circuit) (RC).

One end of each receiving coil 140 and one end of each lateral surface heating coil 150 may be directly connected, and the other end of each receiving coil 140 and the other end of each lateral surface heating coil 150 may be connected through both ends of the resonance capacitor (Cr). Accordingly, the receiving coil 140, the lateral surface heating coil 150 and the resonance capacitor (Cr) may form an L-C resonance circuit (RC).

The L-C resonance circuit (RC) may be magnetically coupled to the working coil 210 around a resonance frequency. In this case, entire impedance of the wireless induction heating cooker 100 may become very high.

Accordingly, a magnetic field generated in the working coil 210 may have high intensity, and a large amount of heat may be generated in the internal pot 130.

As each of the plurality of receiving coils 140 and each of the plurality of lateral surface heating coils 150 are connected to each other as described above, induced currents may be supplied to the plurality of lateral surface heating coils 150 by the plurality of receiving coils 140 connected to the plurality of lateral surface heating coils 150. That is, as described above, the electric currents induced to the receiving coil 140 may be supplied to the lateral surface heating coil 150 connected to the receiving coil 140.

In this case, the lateral surface heating coil 150 may heat the lateral surface of the internal pot 130 using the induced currents supplied by the receiving coil 140. Specifically, when induced currents flow through the lateral surface heating coil 150, a magnetic field may be generated in the lateral surface heating coil 150. The magnetic field generated in the lateral surface heating coil 150 may induce electric currents to the lateral surface of the internal pot 130, and Joule's heat may be generated on the lateral surface of the internal pot 130 by the induced currents.

That is, the internal pot 130, as described above, may be heated by a magnetic field generated in the working coil 210 or by a magnetic field generated in the receiving coil 140 or by a magnetic field generated in the lateral surface heating coil 150.

The present disclosure, as described above, may heat even the lateral surface of the internal pot 130 using a magnetic field generated in the working coil 210 of the induction heating apparatus, thereby forming a plurality of paths for heat delivery with a single heat source and ensuring temperature uniformity based on height of the internal pot 130.

Below, an arrangement of the receiving coil 140 and the lateral surface heating coil 150 on opposite sides is described. For convenience of description, two pairs of the receiving coils 140 and the lateral surface heating coils 150 are described.

Referring to FIG. 5 that is a longitudinal cross-sectional view of the internal pot 130, the receiving coil 140 and the lateral surface heating coil 150, the plurality of receiving coils 140 may include first and second receiving coils 140a, 140b. In this case, the lateral surface heating coil 150 may include a first lateral surface heating coil 150a connected to the first receiving coil 140a and disposed on the opposite side of the first receiving coil 140a, and a second lateral surface heating coil 150b connected to the second receiving coil 140b and disposed on the opposite side of the second receiving coil 140b.

The connected receiving coil 140 and lateral surface heating coil 150 may form a pair. Specifically, the first receiving coil 140a, and the first lateral surface heating coil 150a connected with the first receiving coil 140a may form a pair, and the second receiving coil 140b, and the second lateral surface heating coil 150b connected with the second receiving coil 140b may form a pair.

The receiving coil 140, as described above, may be disposed on the bottom surface 110b of the main body 110, and the lateral surface heating coil 150 may be disposed on the lateral surface of the internal pot 130. In this case, a pair of the receiving coil 140 and the lateral surface heating coil 150 may be disposed on opposite sides.

Specifically, as illustrated in FIG. 5, in case the first receiving coil 140a is placed on the left side of the bottom surface 110b of the main body 110, the first lateral surface heating coil 150a may be placed on the right side of the lateral surface of the internal pot 130. Likewise, in case the second receiving coil 140b is placed on the right side of the bottom surface 110b of the main body 110, the second lateral surface heating coil 150b may be placed on the left side of the lateral surface of the internal pot 130.

In some examples, where the internal pot 130 has a cylinder shape or a polyprism shape, centers of the receiving coil 140 and the lateral surface heating coil 150 may be connected to each other. In other words, centers of the pair of the receiving coil 140 and the lateral surface heating coil 150 may be respectively placed on a straight line that crosses a central perpendicular line (CL) of the internal pot 130. For example, the plurality of receiving coils 140 may be arranged symmetrically with respect to a reference line that vertically passes a center of the internal pot. In this case, the reference line is the central perpendicular line (CL) of the internal pot 130.

Referring back to FIG. 5, an outer circumferential surface of the internal pot 130 may have a predetermined radius with respect to the central perpendicular line (CL). In this case, a center (CP1) of the first receiving coil 140a and a center (CP1') of the first lateral surface heating coil 150a may be placed on a straight line that passes the central perpendicular line (CL). Additional, a center (CP2) of the second receiving coil 140b and a center (CP2') of the second lateral surface heating coil 150b may be placed on the straight line that passes the central perpendicular line (CL).

In some examples, each of the plurality of lateral surface heating coils 150 may be disposed on a plane that is inclined with respect to the bottom surface of the main body. For example, each of the plurality of lateral surface heating coils 150 may ha a lower edge and an upper end disposed vertically above the lower edge, where a radial distance between the central perpendicular line (CL) and the lower end may be less than a radial distance between the central perpendicular line (CL) and the upper end.

Referring to FIG. 6A separately illustrating only the plurality of receiving coils 140 and the plurality of lateral surface heating coils 150, and FIG. 6B separately illustrating a state in which the internal pot 130 and the metallic plate 130a are stored on the coil in FIG. 6A, a wireless induction heating apparatus may include six pairs of the receiving coils 140a, 140b, 140c, 140d, 140e, 140f and the lateral surface heating coils 150a, 150b, 150c, 150d, 150e, 150f. Each pair of the receiving coil 140 and the lateral surface heating coil 150 may be electrically connected and may be placed on opposite sides.

The above-described features of positions may be applied to a polyprism-shaped internal pot 130. Accordingly, regardless of the shape of the internal pot 130, a pair of the receiving coil 140 and the lateral surface heating coil 150 may be placed completely on opposite sides.

Below, features of an arrangement of the plurality of receiving coils 140 and an arrangement of the plurality of lateral surface heating coils 150 are described.

A center of each of the plurality of receiving coils 140 and a center of each of the plurality of lateral surface heating coils 150 may be placed in parallel along a circumferential direction of the internal pot 130.

Figure 1B:
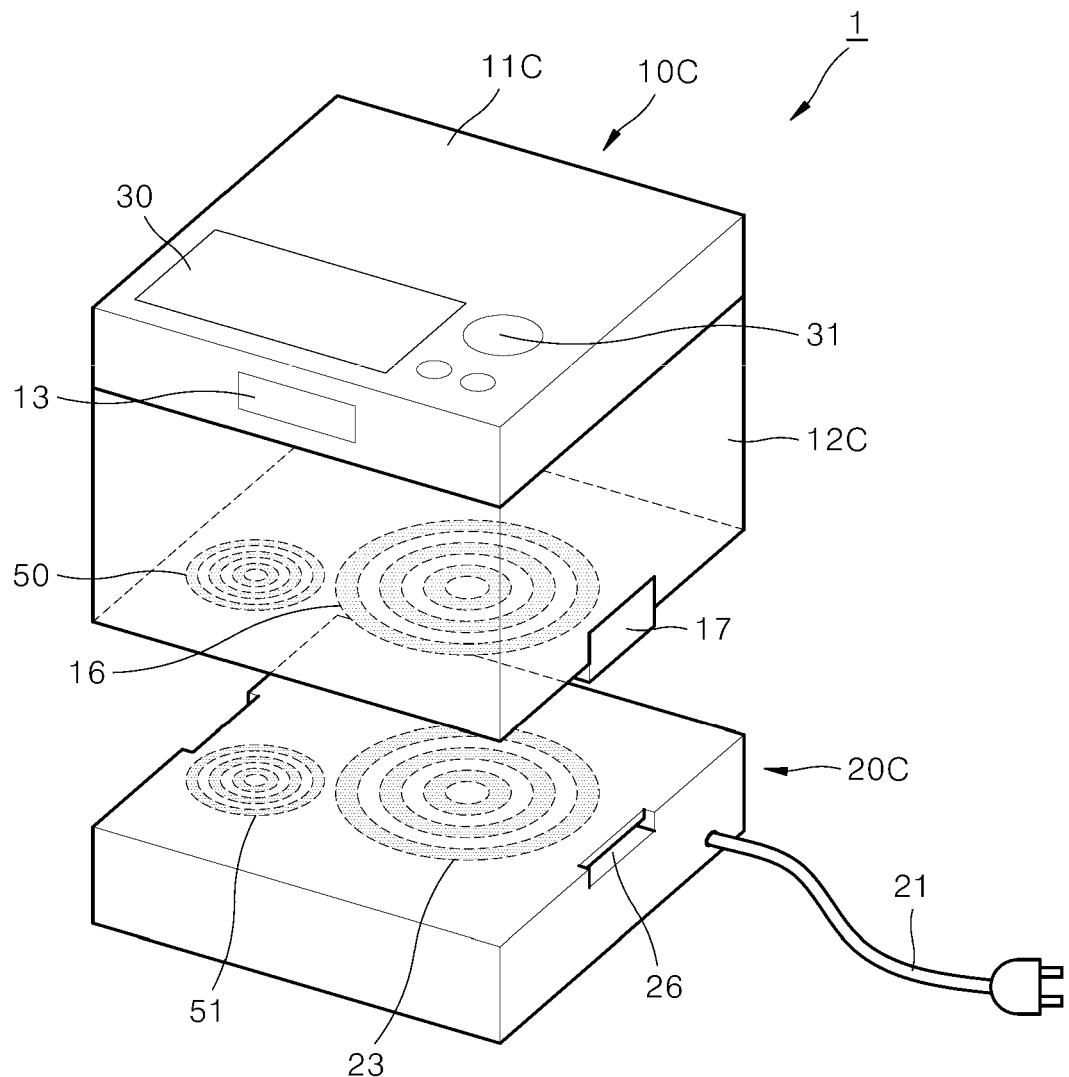

Referring to FIG. 6A, and FIG. 7A illustrating the plurality of receiving coils 140 seen from the Z-axis direction (see. axes of the coordinate in FIG. 1), in case the internal pot 130 has a cylinder shape, centers (CP1 to CP6) of the plurality of receiving coils 140 may be placed in parallel along the circumferential direction, i.e., the circumferential direction of the internal pot 130 on the bottom surface 110b of the main body 110.

Referring to FIGS. 6A and 7B, in case the internal pot 130 has a cylinder shape, centers (CP1' to CP6') of the plurality of lateral surface heating coils 150 may be placed in parallel along the circumferential direction, i.e., the circumferential direction of the internal pot 130 on the lateral surface of the internal pot 130.

In this case, each of the plurality of lateral surface heating coils 150 may have the same height. Specifically, a height from the bottom surface 110b of the main body 110 to the center of each lateral surface heating coil 150 may be the same. Accordingly, the plurality of lateral surface heating coils 150 may heat the lateral surface of the internal pot 130 at the same height.

The plurality of receiving coils 140 and the plurality of lateral surface heating coils 150 may be arranged regularly and in a parallel fashion.

Specifically, referring to FIG. 7A, a distance from the central perpendicular line (CL) of the internal pot 130 to the center (CP1 to CP6) of each receiving coil 140 may be D1 that is the same. Further, referring to FIG. 7B, a distance from the central perpendicular line (CL) of the internal pot 130 to the center (CP1 to CP6) of each lateral surface heating coil 150 may be D2 that is the same.

Referring to FIGS. 7A and 7B, central angles defined about the central perpendicular line (CL) of the internal pot 130 between any two adjacent receiving coils 140 (specifically, centers of two receiving coils 140) among the plurality of receiving coils 140 may be defined as θ. The central angles between receiving coils 140 may be equal to one another. Further, a central angle defined about the central perpendicular line (CL) of the internal pot 130 between two adjacent lateral surface heating coils 150 (specifically, centers of two lateral surface heating coils 150) among the plurality of lateral surface heating coils 150 may be defined as θ. The central angles between the lateral surface heating coils 150 may be equal to one another.

Below, features of positions of the plurality of receiving coils 140 are described.

Referring to FIGS. 8A and 8B, the internal pot 130 may include a round portion or a round area (RA) to easily take out a cooked object after an object is cooked. For example, the round area (RA) may extends between a first portion defining a first reference radius (R1) of the internal pot 130 and a second portion defining a second reference radius (R2) of the internal pot 130. In other words, the round area (RA) may be formed from an outer side of the first reference radius (R1) to an inner side of the second reference radius (R2). The second reference radius (R2) may be greater than the first reference radius (R1).

The internal pot 130, as described above, may be heated by a magnetic field generated in the working coil 210, or by a magnetic field generated in the receiving coil 140. In case there are a large number of mediums in the delivery of power, heating efficiency may be deteriorated. In some examples, the internal pot 130 may be heated directly by a magnetic field generated in the working coil 210 rather than by a magnetic field generated in the receiving coil 140 to ensure higher heating efficiency.

In case the receiving coil 140 is placed outside of the working coil 210, electric currents may not be induced to the receiving coil 410 and the lateral surface heating coil 150. The receiving coil 140 may be placed to perpendicularly overlap with the working coil 210.

Referring back to FIGS. 8A and 8B, the internal pot 130 is far from the working coil 210 in the round area (RA). Accordingly, an amount of heat generated by a magnetic field generated in the working coil 210 may be reduced.

In this case, the plurality of receiving coils 140, as illustrated in FIG. 8A, may be placed at a lower portion of the round area (RA), i.e., between the first reference radius (R1) and the second reference radius (R2). Further, the plurality of receiving coils 140, as illustrated in FIG. 8B, may be placed outside of the first reference radius (R1). When the wireless induction heating cooker 100 is aligned on the working coil 210 in case the plurality of receiving coils 140 are placed outside of the first reference radius (R1), the plurality of receiving coils 140 may be placed at an inner side of the working coil 210 to perpendicularly overlap with the working coil 210.

When the receiving coil 140 is placed at the lower portion of the round area (RA) or at the lower portion of an outside area including the round area (RA) where a relatively small amount of heat is generated, electric currents induced to the working coil 210 may be supplied to the lateral surface heating coil 150 without significantly reducing an entire amount of heat generated in the internal pot 130, i.e., an amount of heat that heats the internal pot 130 using a magnetic field generated in the working coil 210. Thus, the present disclosure may efficiently use a magnetic field generated in the working coil 210 to heat the lower portion and the lateral surface of the internal pot 130.

Below, features of positions of the plurality of lateral surface heating coils 150 are described.

The plurality of lateral surface heating coils 150 may be arranged perpendicularly on the outer surface of the internal pot 130.

Referring to FIG. 9A, the internal pot 130, as described with reference to FIGS. 8A and 8B, may include the round area (RA). In this case, the plurality of lateral surface heating coils 150 may be perpendicularly arranged on the outer surface of the internal pot 130 at a height higher than that of the round area (RA). The lateral surface heating coil 150 may be formed horizontally concavely on the basis of curvature of the outer circumferential surface of the internal pot 130. For instance, each of the plurality of lateral surface heating coils 150 may have a convex shape that protrudes outward relative to the lateral surface of the internal pot 130.

The plurality of lateral surface heating coils 150 may also be concavely formed along the round area (RA) of the internal pot 130.

Referring to FIG. 9B, when the internal pot 130 includes the round area (RA), the plurality of lateral surface heating coils 150 may be arranged on the outer surface of the internal pot 130 across the round area (RA). Accordingly, the plurality of lateral surface heating coils 150 may be formed horizontally concavely on the basis of curvature of an outer circumferential surface of the internal pot 130 or may be formed perpendicularly concavely on the basis of curvature of the round area (RA).

Below, a process, in which cooking uniformity is provided through the above-described receiving coil 140 and lateral surface heating coil 150 even when the wireless induction heating cooker 100 is partially misaligned on the working coil 210 of the induction heating apparatus, is described with reference to FIG. 10. For convenience of description, two pairs of the receiving coil 140 and the lateral surface heating coil 150 are only illustrated in FIG. 10.

The wireless induction heating cooker 100 may be misaligned with the working coil 210 by a predetermined distance (d). Specifically, the central perpendicular line (CL) of the internal pot 130 may be misaligned with respect to a central perpendicular line (CL') of the working coil 210 to the right side by d.

In some cases, due to the misalignment, the right side of the internal pot 130 may be placed outside of the working coil 210. Accordingly, an amount of heat delivered to the right side of the internal pot 130 may be smaller than an amount of heat delivered to the left side of the internal pot 130.

In some cases, due to the misalignment, the first receiving coil 140a placed at a lower portion of the left side of the internal pot 130 may be moved to a central portion of the working coil 210 and may perpendicularly overlap with the working coil 210 completely, and the second receiving coil 140b placed at a lower portion of the right side of the internal pot 130 may be moved to an outer side of the working coil 210 such that only a part of the second receiving coil 140b perpendicularly overlaps with the working coil 210.

Accordingly, an amount of electric currents induced to the first receiving coil 140b may be larger than an amount of electric currents induced to the second receiving coil 140b. The first lateral surface heating coil 150a may generate a magnetic field using the electric currents induce to the first receiving coil 140a, and the second lateral surface heating coil 150b may generate a magnetic field using the electric currents induced to the second receiving coil 140b. Thus, the first lateral surface heating coil 150a placed on a right surface of the internal pot 130 may deliver a larger amount of heat to the internal pot 130 than the second lateral surface heating coil 150b placed on a left surface of the internal pot 130.

That is, the first lateral surface heating coil 150a may additionally deliver a large amount of heat to the right surface of the internal pot 130 to which a relatively small amount of heat is delivered directly from the working coil 210. Under the same theory, the second lateral surface heating coil 150b may additionally deliver a small amount of heat to the left surface of the internal pot 130 to which a relatively large amount of heat is delivered directly from the working coil 210.

By doing so, even when the wireless induction heating cooker 100 is misaligned from the working coil 210 by the predetermined distance (d), temperatures of the left side and right side of the internal pot 130 may be maintained similarly, and cooking uniformity of an object cooked in the internal pot 130 may be provided.

The present disclosure, as described above, may provide cooking uniformity even when the wireless induction heating cooker 100 is partially misaligned on the working coil 210 of the induction heating apparatus, thereby ensuring quality cooking uniformity regardless of the position of the wireless induction heating cooker 100 and improving user convenience without strictly requiring a user to align the wireless induction heating cooker 100.

The present disclosure has been described with reference to the implementations illustrated in the drawings. However, the disclosure is not limited to the implementations and the drawings set forth herein. Further, various modifications may be made by one having ordinary skill in the art within the scope of the technical spirit of the disclosure. Further, though not explicitly described during description of the implementations of the disclosure, effects and predictable effects according to the configuration of the disclosure should be included in the scope of the disclosure.

What is claimed is:

1. A wireless induction heating cooker configured to operate on an induction heating apparatus, the wireless induction heating cooker comprising:
   a main body;
   an internal pot configured to be disposed in the main body;
   a plurality of receiving coils disposed at a bottom surface of the main body and arranged along a circumferential direction of the internal pot; and
   a plurality of lateral surface heating coils spaced apart from one another and arranged along a lateral surface of the internal pot, each of the plurality of lateral surface heating coils being connected to one of the plurality of receiving coils that is disposed at an opposite side across a reference line passing through the bottom surface of the main body.

2. The wireless induction heating cooker of claim 1, wherein the plurality of receiving coils comprise a first receiving coil and a second receiving coil, and
   wherein the plurality of lateral surface heating coils comprise:
      a first lateral surface heating coil connected to the first receiving coil and disposed at an opposite side of the first receiving coil with respect to the reference line, and
      a second lateral surface heating coil connected to the second receiving coil and disposed at an opposite side of the second receiving coil with respect to the reference line.

3. The wireless induction heating cooker of claim 1, wherein the plurality of receiving coils are configured to induce electric currents based on a magnetic field being generated in a working coil of the induction heating apparatus.

4. The wireless induction heating cooker of claim 1, wherein each of the plurality of receiving coils is configured to supply induced electric current to a corresponding heating coil among the plurality of lateral surface heating coils, and
   wherein the plurality of lateral surface heating coils are configured to heat the lateral surface of the internal pot based on the induced electric current.

5. The wireless induction heating cooker of claim 1, further comprising a metallic plate disposed on the lateral surface of the internal pot and configured to be heated by a magnetic field generated in the plurality of receiving coils and by the plurality of lateral surface heating coils.

6. The wireless induction heating cooker of claim 1, further comprising a resonance capacitor that connects one of the plurality of receiving coils to one of the plurality of lateral surface heating coils.

7. The wireless induction heating cooker of claim 1, wherein centers of the plurality of receiving coils are arranged on the bottom surface of the main body along the circumferential direction of the internal pot, and
   wherein centers of the plurality of lateral surface heating coils are disposed in a plane parallel to the bottom surface of the main body and are arranged along the circumferential direction of the internal pot.

8. The wireless induction heating cooker of claim 7, wherein vertical distances between the bottom surface of the main body and the centers of the plurality of lateral surface heating coils are equal to one another.

9. The wireless induction heating cooker of claim 1, wherein the reference line is a vertical line through a center of the internal pot,
   wherein radial distances from the vertical line to centers of the plurality of receiving coils are equal to one another, and
   wherein radial distances from the vertical line to centers of the plurality of lateral surface heating coils are equal to one another.

10. The wireless induction heating cooker of claim 1, wherein the plurality of receiving coils are arranged on the bottom surface of the main body that faces a working coil of the induction heating apparatus.

11. The wireless induction heating cooker of claim 1, wherein the internal pot comprises a round portion that extends upward from a bottom surface of the internal pot, the round portion having:
- a lower end that is connected to the bottom surface of the internal pot and that defines a first radius of the internal pot; and
- an upper end that is disposed vertically above the lower end and that defines a second radius of the internal pot that is different from the first radius, and
- wherein the plurality of receiving coils are disposed radially outside the lower end of the round portion.

12. The wireless induction heating cooker of claim 1, wherein the internal pot comprises a round portion that defines a first radius of the internal pot and a second radius of the internal pot, and
- wherein the plurality of receiving coils face a lower part of the round portion of the internal pot.

13. The wireless induction heating cooker of claim 12, wherein the second radius of the internal pot is greater than the first radius of the internal pot, and
- wherein a distance between the reference line and an outer edge of each of the plurality of receiving coils is greater than the second radius of the internal pot.

14. The wireless induction heating cooker of claim 1, wherein a center of one of the plurality of receiving coils and a center of one of the plurality of lateral surface heating coils connected to the one of the plurality of receiving coils are disposed on a line that crosses the reference line.

15. The wireless induction heating cooker of claim 1, wherein the plurality of lateral surface heating coils are vertically arranged on the lateral surface of the internal pot.

16. The wireless induction heating cooker of claim 1, wherein each of the plurality of lateral surface heating coils is disposed on a plane that is inclined with respect to the bottom surface of the main body,
- wherein each of the plurality of lateral surface heating coils has a lower edge facing the bottom surface of the main body and an upper edge disposed vertically above the lower edge, and
- wherein a radial distance between the reference line and the lower edge is less than a radial distance between the reference line and the upper edge.

17. The wireless induction heating cooker of claim 1, wherein the plurality of lateral surface heating coils are disposed concavely along a round portion of the internal pot.

18. The wireless induction heating cooker of claim 1, wherein the reference line is a vertical line through a center of the internal pot,
- wherein central angles defined about the vertical line between two adjacent receiving coils among the plurality of receiving coils are equal to one another, and
- wherein central angles defined about the vertical line between two adjacent lateral surface heating coils among the plurality of lateral surface heating coils are equal to one another.

19. The wireless induction heating cooker of claim 1, wherein the plurality of receiving coils are arranged symmetrically with respect to the reference line, and
- wherein the plurality of lateral surface heating coils are arranged symmetrically with respect to the reference line.

20. The wireless induction heating cooker of claim 1, wherein each of the plurality of receiving coils has a flat shape parallel to the bottom surface of the main body, and
- wherein each of the plurality of lateral surface heating coils has a convex shape that protrudes outward relative to the lateral surface of the internal pot.

* * * * *